(12) United States Patent
Ohta et al.

(10) Patent No.: US 8,247,974 B2
(45) Date of Patent: Aug. 21, 2012

(54) HIGH-PRESSURE DISCHARGE LAMP, LAMP UNIT, AND IMAGE DISPLAY APPARATUS

(75) Inventors: Kazunori Ohta, Osaka (JP); Kouhei Gamada, Osaka (JP); Masayuki Suizu, Kyoto (JP); Shuji Tamaru, Hyogo (JP)

(73) Assignee: Panasonic Corporation, Osaka (JP)

( * ) Notice: Subject to any disclaimer, the term of this patent is extended or adjusted under 35 U.S.C. 154(b) by 129 days.

(21) Appl. No.: 12/997,916

(22) PCT Filed: Jun. 2, 2010

(86) PCT No.: PCT/JP2010/003678
§ 371 (c)(1),
(2), (4) Date: Dec. 14, 2010

(87) PCT Pub. No.: WO2011/007495
PCT Pub. Date: Jan. 20, 2011

(65) Prior Publication Data
US 2011/0193466 A1 Aug. 11, 2011

(30) Foreign Application Priority Data
Jul. 14, 2009 (JP) ................. 2009-165319

(51) Int. Cl.
*H01J 17/20* (2006.01)
*H01J 61/20* (2006.01)
(52) U.S. Cl. ........ 313/639; 313/113; 313/114; 313/571; 313/634; 313/635; 313/318.11

(58) Field of Classification Search .................. 313/113, 313/114, 571, 634, 635, 639, 118.11
See application file for complete search history.

(56) References Cited

FOREIGN PATENT DOCUMENTS

| CA | 2076090 | 3/1993 |
|---|---|---|
| EP | 0 534 606 | 3/1993 |
| JP | 60-070655 | 4/1985 |
| JP | 05-205698 | 8/1993 |
| JP | 2000-311657 | 11/2000 |
| JP | 2005-285417 | 10/2005 |
| JP | 2008-052964 | 3/2008 |

*Primary Examiner* — Nimeshkumar Patel
*Assistant Examiner* — Thomas A Hollweg

(57) ABSTRACT

The present invention aims to provide a small-sized high-efficiency high pressure discharge lamp that exhibits favorable light intensity distribution properties and is less likely to cause breakage of an arc tube. The present invention is a high pressure discharge lamp 101 comprising: an arc tube 110 that includes; a light-emitting part 111 having a substantially spherical shape and having mercury enclosed therein; and a pair of sealing parts 112 extending from opposite sides of the light-emitting part 111; and a pair of electrodes 130 that are arranged in the arc tube 110 such that an end of each electrode is sealed by a respective sealing part and the other ends of the electrodes oppose each other in the light-emitting part. The enclosed mercury has a density of 0.2 to 0.4 [mg/mm$^3$] inclusive. A distance W from a contact point S to a center O is 3.0 to 5.0 [mm] inclusive. A distance $C_O$ from a contact point $T_O$ to the center O is 1.5 to 3.0 [mm] inclusive. The distance $C_O$ and a distance $C_M$ satisfy a relation $C_M/C_O \geqq 0.8$, and a minimum thickness X [mm] and a maximum outer diameter D [mm] satisfy a relation $X/D \geqq 0.2$.

8 Claims, 12 Drawing Sheets

FIG. 4A

Hg density 0.3 mg/mm³

| Minimum thickness X/ Maximum outer diameter D | Maximum outer diameter D [mm] | | |
|---|---|---|---|
| | 8.0 | 9.0 | 10.0 |
| $0.17 \leq (X/D) < 0.18$ | 2/10 | 1/15 | 1/10 |
| $0.18 \leq (X/D) < 0.20$ | 1/25 | 1/30 | 0/25 |
| $0.20 \leq (X/D) < 0.22$ | 0/25 | 0/30 | 0/25 |
| $0.22 \leq (X/D) < 0.23$ | 0/15 | 0/15 | 0/15 |

Number of damaged arc tubes/evaluation samples, Power 200 W

FIG. 4B

Hg density 0.4 mg/mm³

| Minimum thickness X/ Maximum outer diameter D | Maximum outer diameter D [mm] | | |
|---|---|---|---|
| | 8.0 | 9.0 | 10.0 |
| $0.17 \leq (X/D) < 0.18$ | 4/10 | 3/15 | 1/10 |
| $0.18 \leq (X/D) < 0.20$ | 2/25 | 2/30 | 1/25 |
| $0.20 \leq (X/D) < 0.22$ | 0/25 | 0/30 | 0/25 |
| $0.22 \leq (X/D) < 0.23$ | 0/15 | 0/15 | 0/15 |

Number of damaged arc tubes/evaluation samples, Power 200 W

FIG. 5
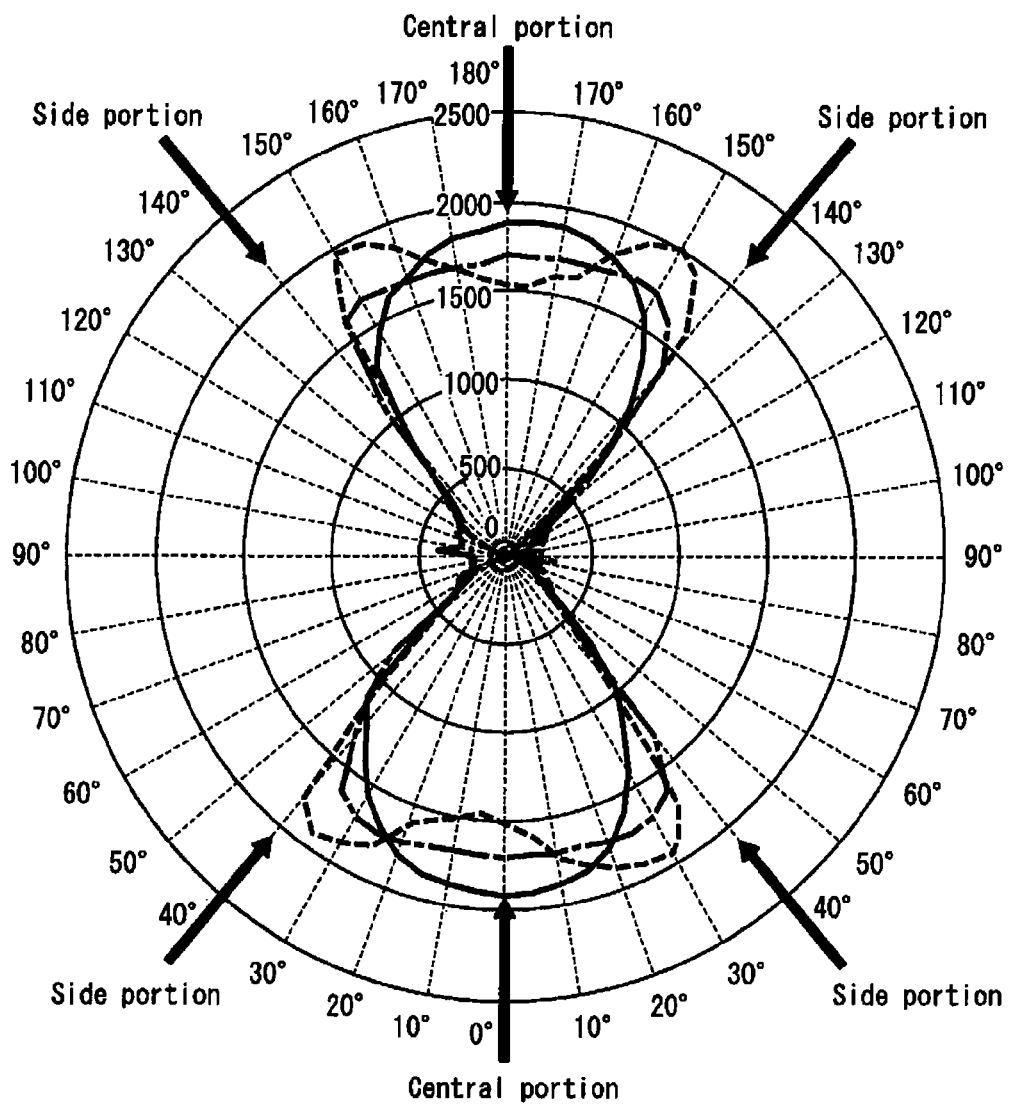
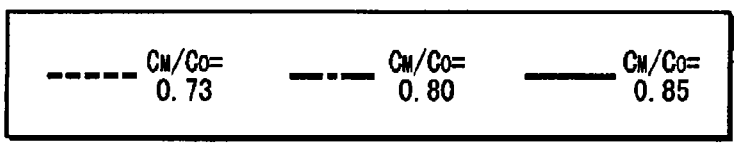

HIGH-PRESSURE DISCHARGE LAMP, LAMP UNIT, AND IMAGE DISPLAY APPARATUS

TECHNICAL FIELD

The present invention relates to a high pressure discharge lamp, a lamp unit, and an image display apparatus.

BACKGROUND ART

As a light source of an image display apparatus such as a projector, a lamp unit including a concave reflecting mirror into which a high pressure discharge lamp is built is commonly used. As a technology to provide improved light to a screen in such a lamp unit, Patent Literature 1 discloses an arc tube having a shape that enables light radiated from a high pressure discharge lamp to be captured by a reflecting mirror efficiently. According to the structure of the arc tube, a radius of curvature of an outer surface of a light-emitting part is smaller in portions close to sealing parts than in a central portion. Therefore, light passing though the portions close to the sealing parts is radiated from the light-emitting part in a direction substantially perpendicular to a tube axis of the arc tube. The high pressure discharge lamp including the arc tube exhibits favorable light intensity distribution properties due to a high level of light radiated in a direction perpendicular to the tube axis of the arc tube, and therefore, is capable of focusing a large amount of light on a reflecting surface of the reflecting mirror. Therefore, it becomes possible to provide improved light to a screen in a lamp unit.

CITATION LIST

Patent Literature

[Patent Literature 1]
Japanese Patent Application Publication No. 2005-285417

SUMMARY OF INVENTION

Technical Problem

When the arc tube disclosed in Patent Literature 1 was employed in a small-sized high-efficiency high pressure discharge lamp that has become popular in the market in recent years, however, breakage of the arc tube occurred due to heat. Presumably, the breakage occurred because of the following reason. In order to reduce a radius of curvature of an outer surface of a light-emitting part in portions close to sealing parts, the thickness of a glass in the portions was reduced, and heat conductivity from a light-emitting part to sealing parts was reduced. This made it difficult for heat evolved in the light-emitting part during lighting of the lamp to escape to a reflecting mirror side through the sealing parts. In other words, as the temperature of the light-emitting part became high due to heat, the temperature of portions of the sealing parts that were close to the light-emitting part became high. Cracks were then produced on a glass in the vicinity of electrodes sealed in the portions, resulting in the breakage of the arc tube.

The present invention has been achieved in view of the above problem. An aim of the present invention is to provide a small-sized high-efficiency high pressure discharge lamp that exhibits favorable light intensity distribution properties and is less likely to cause breakage of the arc tube. Another aim of the present invention is to provide a lamp unit and an image display apparatus that are small in size, provide improved luminous flux to a screen, and are less likely to malfunction.

Solution to Problem

In order to achieve the above aims, one aspect of the present invention is a high pressure discharge lamp comprising: an arc tube that includes: a light-emitting part having a substantially spherical shape and having mercury enclosed therein; and a pair of sealing parts extending from opposite sides of the light-emitting part; and a pair of electrodes that are arranged in the arc tube such that an end of each electrode is sealed by a respective sealing part and the other ends of the electrodes oppose each other in the light-emitting part, wherein the enclosed mercury has a density of 0.2 to 0.4 [mg/mm$^3$] inclusive, a distance W from a contact point S to a center O of the light-emitting part is 3.0 to 5.0 [mm] inclusive, where the contact point S represents a point where a tube axis Z of the arc tube intersects with an inner surface of the arc tube, a distance $C_O$ from a contact point $T_O$ to the center O is 1.5 to 3.0 [mm] inclusive, where the contact point $T_O$ represents a point where a vertical axis $Y_O$, which passes through the center O and is perpendicular to the tube axis Z, intersects with the inner surface of the arc tube, the distance $C_O$ and a distance $C_M$ from a contact point $T_M$ to a midpoint M satisfy a relation $C_M/C_O \geq 0.8$, where the midpoint M represents a midpoint between the center O and the contact point S, and the contact point $T_M$ represents a point where a vertical axis $Y_M$, which passes through the midpoint M and is perpendicular to the tube axis Z, intersects with the inner surface of the arc tube, and a minimum thickness X [mm] of the arc tube in sealing part-side portions and a maximum outer diameter D [mm] of the light-emitting part satisfy a relation $X/D \geq 0.2$, the sealing part-side portions being portions of the light-emitting part that are close to the sealing parts.

Another aspect of the present invention is a lamp unit comprising: the high pressure discharge lamp; and a reflecting mirror that includes: a neck part to which one of the sealing parts of the high pressure discharge lamp is fixed; and a spheroidal surface that reflects light radiated from the high pressure discharge lamp.

Yet another aspect of the present invention is an image display apparatus comprising the lamp unit.

Advantageous Effects of Invention

The high pressure discharge lamp of the present invention is small in size and highly efficient, because mercury is enclosed therein with a density of 0.2 to 0.4 [mg/mm$^3$] inclusive, the distance W is 3.0 to 5.0 [mm] inclusive, and the distance $C_O$ is 1.5 to 3.0 [mm] inclusive. The high pressure discharge lamp exhibits favorable light intensity distribution properties, because the distance $C_M$ and the distance $C_O$ satisfy the relation $C_M/C_O \geq 0.8$. Furthermore, the high pressure discharge lamp is less likely to cause breakage of the arc tube, because the minimum thickness X [mm] and the maximum outer diameter D [mm] satisfy the relation $X/D \geq 0.2$.

The lamp unit and the image display apparatus of the present invention each include the small-sized high-efficiency high pressure discharge lamp that provides favorable light intensity distribution properties and is less likely to cause breakage of the arc tube as described above, and therefore each of the lamp unit and the image display apparatus of the present invention is small in size, provides improved luminous flux to a screen, and is less likely to malfunction.

BRIEF DESCRIPTION OF DRAWINGS

FIG. 4A shows a relation between X/D and breakage of arc tubes when the density of mercury is 0.3 [mg/mm$^3$], and FIG. 4B shows the relation between X/D and breakage of arc tubes when the density of mercury is 0.4 [mg/mm$^3$];

FIG. 5 shows a relation between $C_M/C_O$ and light intensity distribution properties;

DESCRIPTION OF EMBODIMENTS

Figure 1A:
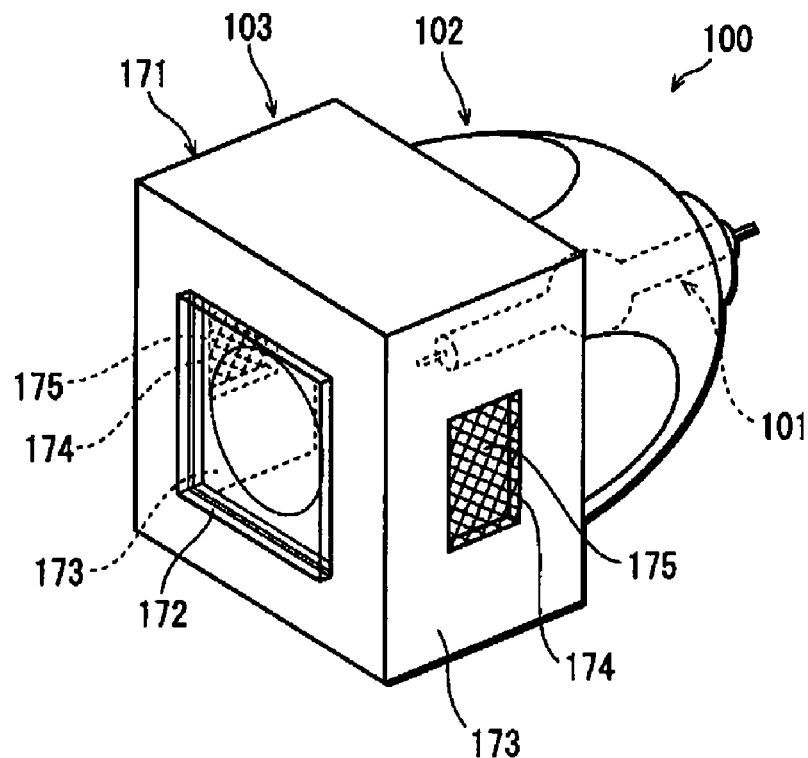
FIG. 1A is a perspective view of a lamp unit in Embodiment 1.

The following describes a high pressure discharge lamp, a lamp unit, and an image display apparatus in embodiments with reference to the drawings. Note that the drawings are not to scale so that proportions of members in the drawings are different from actual proportions.

[Configuration of High Pressure Discharge Lamp and Lamp Unit]

Figure 1B:
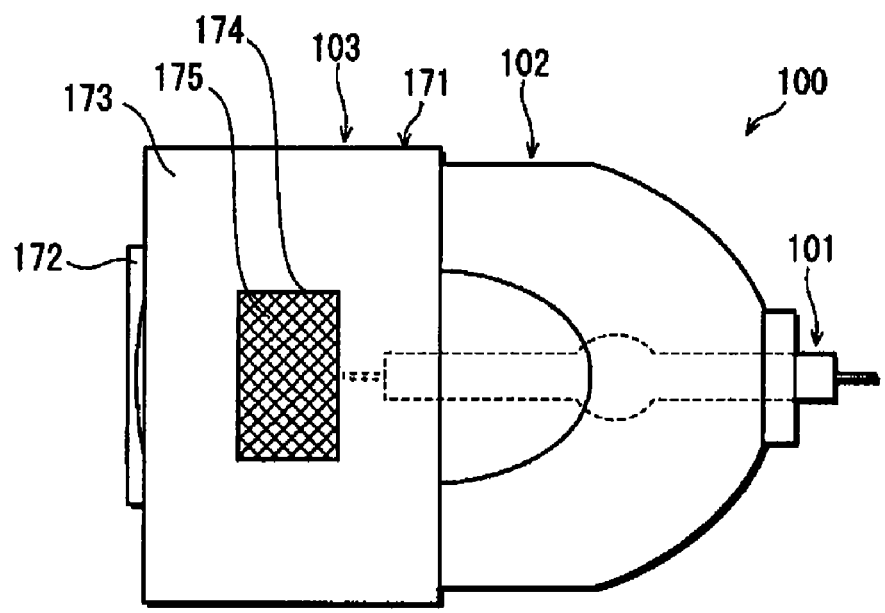
FIG. 1B is a side view of the lamp unit in Embodiment 1.

FIG. 1A is a perspective view of a lamp unit in Embodiment 1. FIG. 1B is a side view of the lamp unit in Embodiment 1. As shown in FIGS. 1A and 1B, a lamp unit 100 includes a high pressure discharge lamp 101 in Embodiment 1, a reflecting mirror 102, and a housing 103.

Figure 2:
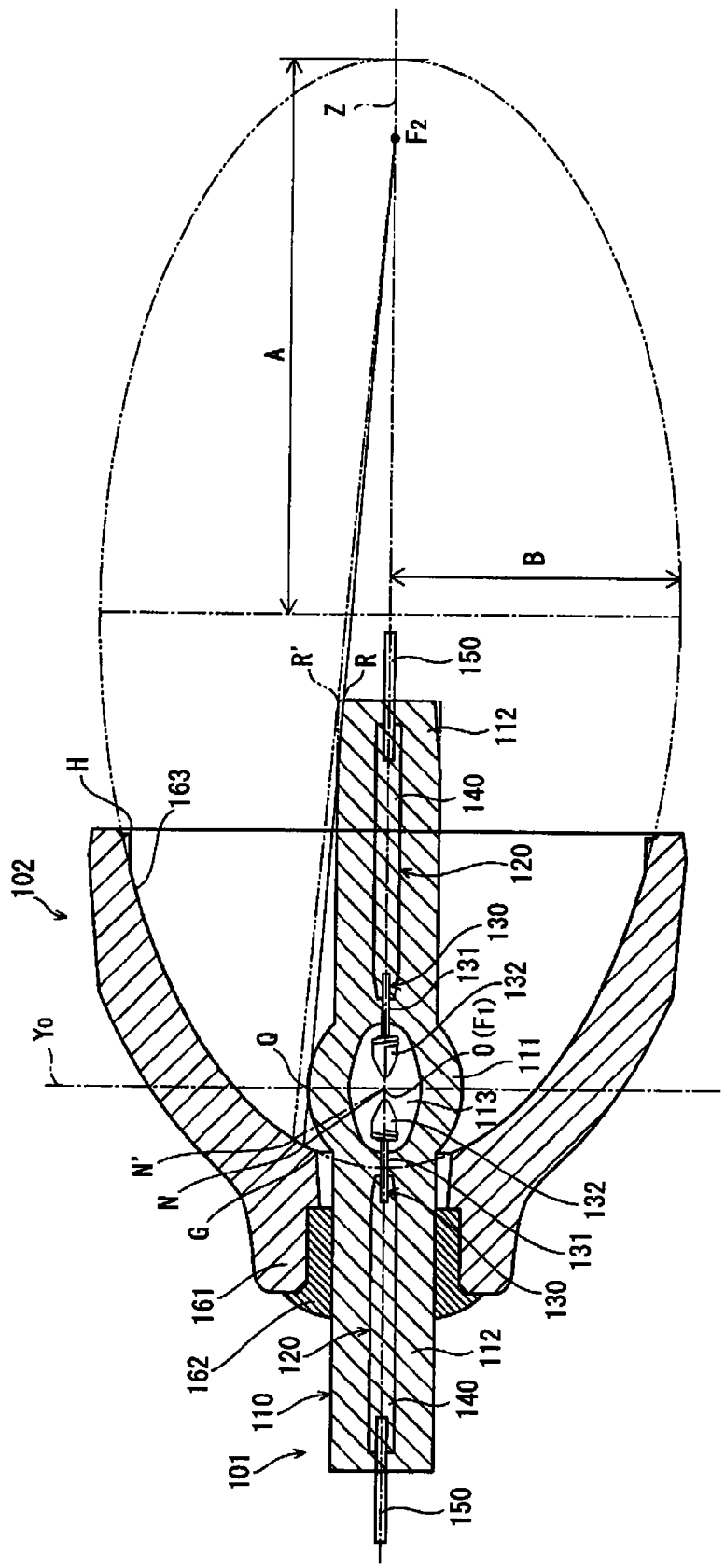
FIG. 2 is a sectional view of the lamp unit in Embodiment 1.

FIG. 2 is a sectional view of the lamp unit in Embodiment 1. The housing is omitted from FIG. 2. As shown in FIG. 2, the high pressure discharge lamp 101 is a so-called double-end high pressure mercury lamp, and includes an arc tube 110 made of fused silica and a pair of electrode assemblies 120. The arc tube 110 includes a light-emitting part 111 having a substantially spherical shape and a pair of sealing parts 112 connected to opposite sides of the light-emitting part 111. The high pressure discharge lamp 101, for example, has a rated power of 200 [W] and a rated voltage of 70 [V].

Figure 3:
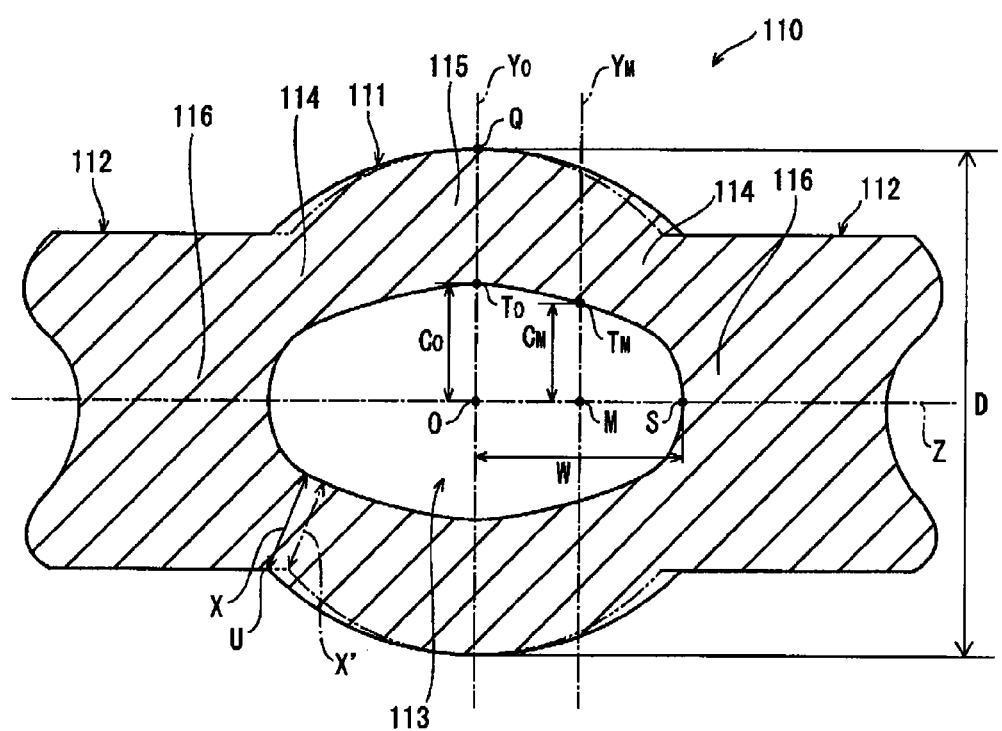
FIG. 3 is a sectional view of an arc tube in the vicinity of a light-emitting part thereof.

FIG. 3 is a sectional view of the arc tube in the vicinity of the light-emitting part thereof. The electrode assemblies are omitted from FIG. 3. As shown in FIG. 3, a maximum outer diameter D of the arc tube 110 in the light-emitting part 111 is about 9.0 [mm], and a radius of curvature of an outer surface of the arc tube 110 in the light-emitting part 111 is about 5.45 [mm]. Inside the light-emitting part 111, a discharge space 113 with a capacity of about 60 [mm$^3$] is formed.

A distance W from a contact point S to a center O of the light-emitting part 111 (a center of the discharge space 113) is about 4 [mm]. A distance $C_O$ from a contact point $T_O$ to the center O is about 2.0 [mm]. Note that the distance $C_O$ corresponds to a radius of a maximum circle that is enclosed in the discharge space 113 and has a center coinciding with the center O. A distance $C_M$ from a contact point $T_M$ to a midpoint M between the center O and the contact point S is about 1.7 [mm]. Note that the distance $C_M$ corresponds to a radius of a maximum circle that is enclosed in the discharge space 113 and has a center coinciding with the midpoint M. A minimum thickness X of the arc tube 110 in a sealing part-side portion 114 is about 1.95 [mm]. Here, the contact point S is a point where a tube axis Z of the arc tube 110 intersects with an inner surface of the arc tube 110. The contact point $T_O$ is a point where a vertical axis $Y_O$, which passes through the center O and is perpendicular to the tube axis Z, intersects with the inner surface of the arc tube 110. The contact point $T_M$ is a point where a vertical axis $Y_M$, which passes through the midpoint M and is perpendicular to the tube axis Z, intersects with the inner surface of the arc tube 110.

Note that, in embodiments, the center O of the light-emitting part 111 is defined as a midpoint of a line segment corresponding to a part of the tube axis Z that is in the discharge space 113. In the present application, for purposes of discussion, the light-emitting part 111 is divided into portions by the vertical axis $Y_M$. Portions that are close to the sealing part 112 are defined as the sealing part-side portions 114. Whereas the other portions that are close to the center O are defined as central portions 115. The minimum thickness X is defined as a minimum distance from a boundary U on an outer surface of the arc tube 110 to an inner surface of the arc tube 110. Here, the boundary U is a boundary between the light-emitting part 111 and the sealing part 112.

Note that dimensions of the light-emitting part 111 are not limited to the above, and can be changed accordingly depending on specifications of the high pressure discharge lamp 101. In order to reduce the size of the high pressure discharge lamp 101, however, the distance W needs to fall within a range of 3.0 to 5.0 [mm] inclusive, and the distance $C_O$ needs to fall within a range of 1.5 to 3.0 [mm] inclusive. In order to provide the high pressure discharge lamp 101 exhibiting favorable light intensity distribution properties, the distance $C_M$ and the distance $C_O$ need to satisfy a relation $C_M/C_O \geq 0.8$. In order to prevent the breakage of the arc tube 110, the minimum thickness X and the maximum outer diameter D need to satisfy a relation $X/D \geq 0.2$. Detailed reasons for these dimensions are described later.

The discharge space 113 is filled with mercury (Hg) as a luminescent material with a density of about 0.2 to 0.4 [mg/mm$^3$] inclusive, a rare gas as a starting aid at a pressure of about 30 [kPa], and bromine (Br) as a halogen material with a density of about $10^{-7}$ to $10^{-2}$ [μmol/mm$^3$] inclusive. Mercury vapor pressure during lighting of a lamp is about 20 to 30 [kPa] inclusive. The high pressure discharge lamp 101 is highly efficient, because mercury is enclosed therein with a density of about 0.2 to 0.4 [mg/mm$^3$] inclusive.

Note that the luminescent material is not limited to mercury, and alkali metal atoms and the like may be used as the luminescent material. Examples of the rare gas are argon (Ar), krypton (Kr), xenon (Xe), and a mixture of at least two of them. Examples of the halogen material are iodine (I), bromine (Br), chlorine (Cl), and a mixture of at least two of them. The mercury vapor pressure during lighting of a lamp is not limited to approximately 20 to 30 [kPa] inclusive.

Referring back to FIG. 2, each of the pair of the sealing parts 112 has, for example, a substantially cylindrical shape. An outer diameter of the sealing part 112 is about 5.2 [mm], and a distance from the center O to the farthest end of the sealing part 112 is 22.5 [mm]. Each of the electrode assemblies 120 is sealed by a corresponding one of the pair of the sealing parts 112. Only one of the pair of the sealing parts 112 is fixed to a neck part 161 of the reflecting mirror 102 with cement 162 or the like. Note that dimensions of the sealing part 112 are not limited to the above, and can be changed accordingly depending on specifications of the high pressure discharge lamp 101. It is preferable, however, that the outer diameter of the sealing part 112 fall within a range of 5.0 to 6.0 [mm] inclusive.

Each of the electrode assemblies 120 includes an electrode 130, a metallic foil 140, and an outer lead wire 150. The electrode assembly 120 is made, for example, by welding the electrode 130, the metallic foil 140, and the outer lead wire 150 together in this order. The electrode assembly 120 is sealed by the sealing part 112 mainly in a part of the metallic foil 140.

The electrode 130 includes, for example, an electrode pin 131 and a coil 132 that are each made of tungsten. The coil 132 wraps one end of the electrode pin 131 by fusing. The pair of the electrodes 130 are disposed in opposition to each other with a distance of about 0.95 [mm] therebetween in the discharge space 113 so that the electrodes 130 are substantially on the same straight line in a state where one end of the electrode 130 is sealed by a respective sealing part 112. It is preferable that the distance between opposing tips of the pair of the electrodes 130, namely an arc length, fall within a range of 0.5 to 2.0 [mm] inclusive in order to place the high pressure discharge lamp close to a point light source.

A tip of each of the pair of the electrodes 130 increases in diameter by being wrapped by the coil 132. With this structure, heat capacity is improved, and thus degradation of the electrodes 130 is lessened. Furthermore, the tip of each of the pair of the electrodes 130 increases in surface area by being wrapped by the coil 132. With this structure, heat dissipation is improved, and thus the temperature of the electrodes 130 is prevented from increasing unnecessarily. It is preferable that the tip of each of the pair of the electrodes 130 be tapered, in order to prevent vignetting caused by the electrode 130.

The metallic foil 140 is, for example, substantially strip-shaped and made of molybdenum. The metallic foil 140 has a width of about 14 [mm] in a longer direction, and has a width of about 1.5 [mm] in a shorter direction. The thickness of the metallic foil 140 is about 20 [mm]. Dimensions of the metallic foil 140 are not limited to the above. It is preferable, however, that the width in a longer direction fall within a range of 10 to 20 [mm] inclusive, the width in a shorter direction fall within a range of 1.0 to 2.0 [mm] inclusive, and the thickness of the metallic foil 140 fall within a range of 10 to 30 [mm] inclusive.

The electrode 130 is joined to one end of the metallic foil 140, and the outer lead wire 150 is joined to the other end of the metallic foil 140. The whole metallic foil 140 is buried in the sealing part 112. By interposing the metallic foil 140 between the electrode 130 and the outer lead wire 150, and sealing the electrode assembly 120 mainly in a part of the metallic foil 140 as described above, the discharge space 113 is made airtight.

The outer lead wire 150 is, for example, made of molybdenum. One end of the outer lead wire 150 that is on a side of the metallic foil 140 is buried in the sealing part 112, and the other end of the outer lead wire 150 is drawn from the sealing part 112 to the outside.

The reflecting mirror 102 is a funnel-shaped dichroic reflecting mirror including the neck part 161 and a spheroidal surface 163. One of the pair of the sealing parts 112 of the high pressure discharge lamp 101 is fixed to the neck part 161.

The spheroidal surface 163 reflects light radiated from the high pressure discharge lamp 101 to a side of the housing 103. The reflecting mirror 102 is made by pressing a heat-resistant material such as a borosilicate glass, an aluminosilicate glass, and a crystallized glass.

The spheroidal surface 163 is composed of an optical multilayer made by a vacuum deposition method, sputtering method, ion assisted deposition method, or the like. The multilayer transmits or reflects light according to wavelength, and thereby suppressing increase in temperature of the reflecting mirror and improving reflection efficiency.

The spheroidal surface 163 has a structure in which an angle $OF_2R$ is equal to or less than an angle $OF_2Q$ (In FIG. 2, the angle $OF_2R$ is equal to the angle $OF_2Q$). Here, when the center O coincides with a first focal point $F_1$ of the spheroidal surface 163, the angle $OF_2R$ represents an angle made by the center O, a second focal point $F_2$ of the spheroidal surface 163, and a periphery R of the end of the sealing part 112 that is not fixed to the neck part 161. The angle $OF_2Q$ represents an angle made by the center O, the second focal point $F_2$, and a contact point Q where an outer surface of the light-emitting part intersects with the vertical axis $Y_O$. A major radius A and a minor radius B of the spheroidal surface 163 satisfy a relation $0.4 \leq (A-B)/A \leq 0.6$. With these structures, the high pressure discharge lamp 101 exhibits favorable light intensity distribution properties. Detailed reasons for these dimensions are described later.

Referring back to FIGS. 1A and 1B, the housing 103 includes a box-shaped body 171. A collimating lens 172 is joined to the body 171 on a side opposite to the reflecting mirror 102, for example, with a silicone adhesive agent (not illustrated) or by a brace (not illustrated).

A cooling window 174 for taking an outdoor air in the body 171 is provided in each of opposing side walls 173 of the body 171. The high pressure discharge lamp 101, which is surrounded by the reflecting mirror 102 and the housing 103, is cooled efficiently by the cooling window 174. With this structure, the light-emitting part 111 and the sealing part 112 of the high pressure discharge lamp 101 are kept at a suitable temperature, and deterioration and breakage of the light-emitting part 111 due to heat are less likely to occur. Note that a dust-proof filter 175 is attached to the cooling window 174.

[Details of Shape of Light-Emitting Part]

The following describes optimum dimensions of the light-emitting part 111 and critical importance thereof.

<Relation $X/D \geq 0.2$>

FIG. 4A shows a relation between X/D and breakage of arc tubes when the density of mercury is 0.3 [mg/mm$^3$], and FIG. 4B shows the relation between X/D and breakage of arc tubes when the density of mercury is 0.4 [mg/mm$^3$]. Values in FIGS. 4A and 4B show ratios of the number of damaged arc tubes to the number of evaluation samples.

In order to examine the effects of the value X/D on breakage of arc tubes due to heat, a variety of high pressure discharge lamps each having a different value X/D were produced, and the frequency of breakage of the produced high pressure discharge lamps was evaluated. In particular, regarding three types of high pressure discharge lamps each having a maximum outer diameter D of 8.0 [mm], 9.0 [mm], and 10.0 [mm] and having the same radius of curvature of an outer surface of the light-emitting part, the minimum thickness X was adjusted so that each of the high pressure discharge lamps had a different value X/D. Then, the frequency of breakage of the produced high pressure discharge lamps was evaluated.

Each of the high pressure discharge lamps was lit at 200 [W] power. At this time, cooling of each of the high pressure discharge lamps was not performed in order to increase the temperature of the light-emitting part and the sealing parts as much as possible, and thereby increasing the extent of heat shock. In one lighting cycle, each of the high pressure discharge lamps was turned on and lit for an hour, and then turned off and kept for half an hour. The lighting cycle was repeated so that total lighting hours were set to be 30 hours. The thickness was measured by processing an image of the arc tube 110 captured by an X-ray apparatus. Note that, since the sealing part-side portions were on opposite sides of the light-emitting part, the minimum thickness X was determined by measuring thicknesses of both of the sealing part-side portions and selecting a thinner one.

As shown in FIG. 4A, when the density of mercury was 0.3 [mg/mm$^3$], breakage of arc tubes did not occur as long as the relation X/D$\geqq$0.20 was satisfied. As shown in FIG. 4B, when the density of mercury was 0.4 [mg/mm$^3$], breakage of arc tubes also did not occur as long as the relation X/D$\geqq$0.20 was satisfied.

When a relation X/D<0.20 was satisfied, however, the number of damaged arc tubes was a little larger in a case where the density of mercury was 0.4 [mg/mm$^3$] than in a case where the density of mercury was 0.3 [mg/mm$^3$]. Presumably, this is because the mercury vapor pressure was increased due to an increase in the density of mercury.

The following describes the reason why breakage of arc tubes did not occur when the relation X/D$\geqq$0.20 was satisfied.

To begin with, the maximum outer diameter D is determined by a size of the discharge space 113 and a glass thickness of the light-emitting part 111. The discharge space 113, however, needs to have a certain size. Therefore, in order to reduce the size of the high pressure discharge lamp, the maximum outer diameter D has to be reduced. As a result, the glass thickness in the sealing part-side portion has to be reduced accordingly.

The reason why the discharge space needs to have a certain size is that tungsten adheres to an inner surface of the arc tube when a luminescence center is positioned too close to the inner surface. This can blacken the arc tube, and cause an error in a halogen cycle to degrade the electrode. In addition, when the discharge space is small, fused silica constituting the arc tube is clouded because of an increase in temperature of the inner surface of the arc tube. This causes a reduction of luminous flux.

Next, when the glass thickness of the sealing part-side portion is reduced, the temperature of the sealing part is increased in a portion close to the light-emitting part. This could lead to an occurrence of cracks. This is because of the following reason. A coefficient of thermal expansion of the electrode pin made of tungsten is 38×10$^{-7}$[/° C.], whereas a coefficient of thermal expansion of the sealing part made of fused silica is 5×10$^{-7}$[/° C.]. There is a great difference between them. When the temperature of the sealing part becomes high in the portion close to the light-emitting part, the difference causes stresses on the portion. As a result, cracks might occur in a glass surrounding the electrode pin, and the cracks might develop.

In particular, when the rated power P is in a range of 100 to 300 [W] inclusive, and the maximum outer diameter D and the rated power P satisfy a relation D$\leqq$0.02×P+6 (for example, when the rated power P is 200 [W], and the maximum outer diameter D is equal to or smaller than 10.0 [mm]), the temperature of the light-emitting part 111 is likely to become high. In this case, cracks are likely to occur and cracks having occurred in a sealing process of the high pressure discharge lamp 101 are likely to develop because of the stresses.

According to the high pressure discharge lamp 101 in Embodiment 1, the glass thickness is large in the sealing part-side portion 114 of the light-emitting part 111, because the minimum thickness X [mm] and the maximum outer diameter D [mm] satisfy the relation X/D$\geqq$0.2. This structure makes it easy to conduct heat, which is generated in the discharge space 113 and transmitted to the light-emitting part 111, to the sealing parts 112 through glasses in the sealing part-side portions 114, and to allow the heat to escape to a side of the reflecting mirror 102 through the sealing parts 112. Therefore, the temperature of the light-emitting part 111 is less likely to become high. As a result, the temperature of light-emitting part-side portions 116 of the sealing part 112 by which the electrodes 130 are sealed is also less likely to become high, and therefore cracks are less likely to occur in a glass surrounding the electrode 130 and breakage of the arc tube 110 is less likely to occur.

In order to prevent vignetting caused by the light-emitting part 111 obstructing light reflected by the spheroidal surface 163, it is preferable to reduce the maximum outer diameter D as much as possible.

<Relation $C_M/C_O \geqq 0.80$>

In order to examine the effects of a value $C_M/C_O$ on light intensity distribution properties, three types of high pressure discharge lamps each having a different value $C_M/C_O$ were produced, and light intensity distribution properties of each of the produced high pressure discharge lamps were evaluated. In each of the produced high pressure discharge lamps, the maximum outer diameter D was 9.0 [mm], the distance $C_O$ was 2.0 [mm], and the radius of curvature of an outer surface of the light-emitting part 111 was 5.45 [mm]. The light intensity distribution properties were evaluated by measuring illuminance during lighting of the lamp by using a luxmeter located at a distance of 30 cm from the center O while the arc tube is rotated 360 degrees around the center O.

Figure 6:
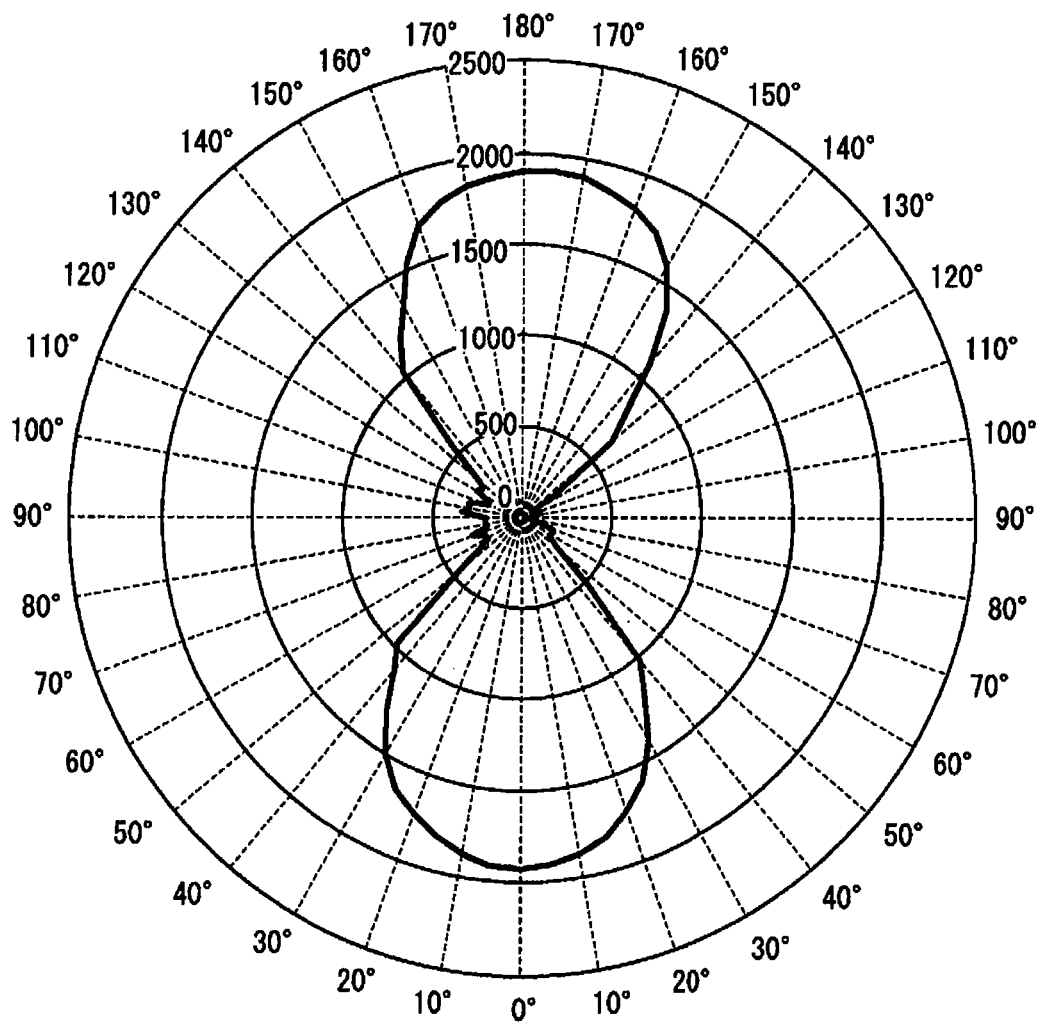
FIG. 6 shows ideal light intensity distribution properties.

FIG. 5 shows a relation between $C_M/C_O$ and light intensity distribution properties. FIG. 6 shows ideal light intensity distribution properties. As shown in FIG. 5, when $C_M/C_O$ is 0.73, the high pressure discharge lamp exhibited heart-shape light intensity distribution properties indicating that a level of luminous flux was higher in the sealing part-side portions than in the central portion. When $C_M/C_O$ is 0.80, the sealing part-side portions were substantially equal in level of luminous flux to the central portion. Compared with a case when $C_M/C_O$ is 0.73, the level of luminous flux was decreased in the sealing part-side portions and increased in the central portion. When $C_M/C_O$ is 0.85, the high pressure discharge lamp exhibited ideal light intensity distribution properties as shown in FIG. 6 indicating that the level of luminous flux was higher in the central portion than in the sealing part-side portions.

As described above, it was found that the higher $C_M/C_O$ was, the better the light intensity distribution properties were. When $C_M/C_O$ was equal to or higher than 0.80, the level of light in the central portion was equal to or higher than the level of light in the sealing part-side portions. The reason why the light intensity distribution properties are improved as $C_M/C_O$ increases is that, when $C_M/C_O$ is high, light passing though the central portion can be radiated from the light-emitting part in a direction substantially perpendicular to a tube axis of the arc tube (in a direction substantially parallel to the vertical axis YO).

Figure 7:
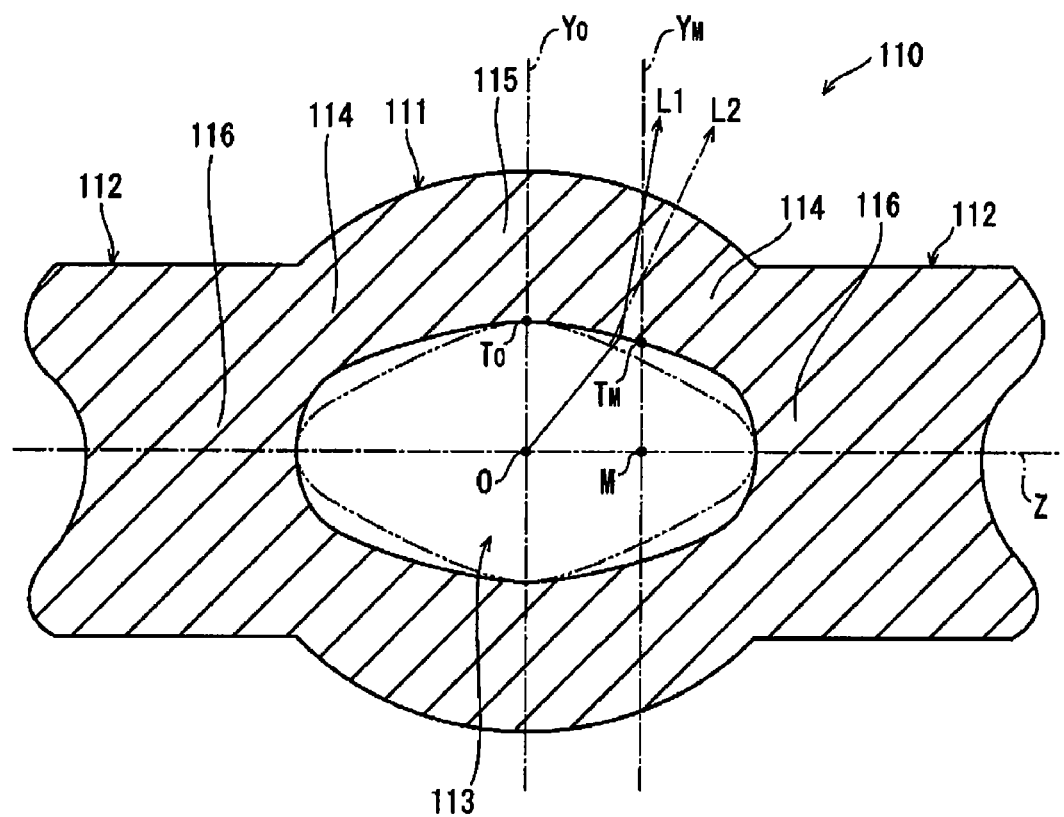
FIG. 7 shows an effect of $C_M/C_O$ on a light path of light radiated from a light-emitting part.

FIG. 7 shows an effect of $C_M/C_O$ on a light path of light radiated from a light-emitting part. As shown in FIG. 7, when $C_M/C_O$ is 0.80, light passing through the central portion 115 of the light-emitting part 111 follows a light path L1. On the other hand, when $C_M/C_O$ is 0.73, since the inner surface of the arc tube 110 has a shape shown by an imaginary line, the light passing through the central portion 115 of the light-emitting part 111 follows a light path L2. As described above, when $C_M/C_O$ becomes high, the light passing through the central portion 115 is radiated from the light-emitting part 111 in a direction substantially perpendicular to the tube axis Z of the arc tube 110. In other words, the higher $C_M/C_O$ is, the smaller an angle made by the light passing through the central portion 115 and the vertical axis $Y_O$ becomes. Therefore, the level of light radiated in the direction perpendicular to the tube axis Z is increased, and thus light intensity distribution properties are improved.

Figure 8A:
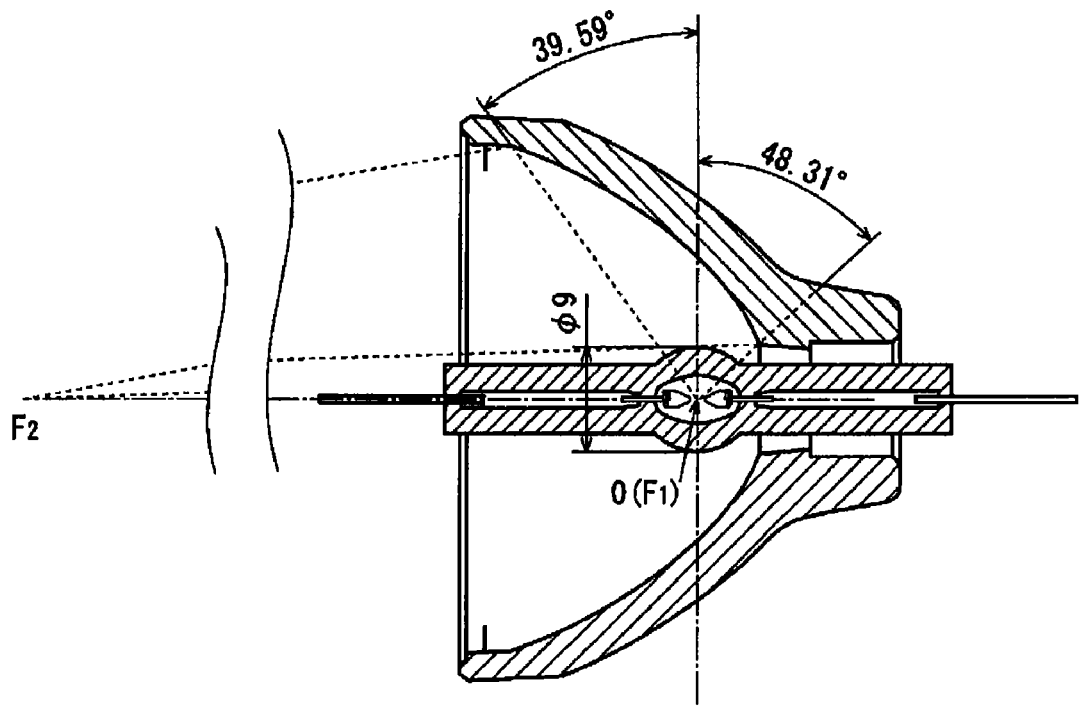
FIG. 8A is a sectional view of a lamp unit including a reflecting mirror with a mirror diameter of 50 mm.
Figure 8B:
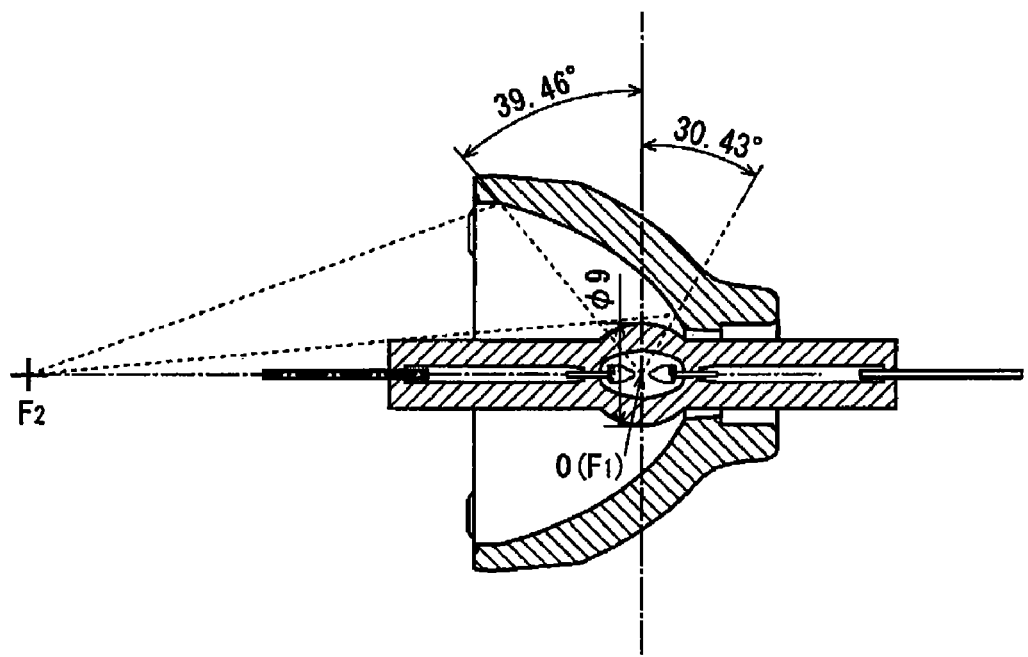
FIG. 8B is a sectional view of a lamp unit including a reflecting mirror with a mirror diameter of 35 mm.

FIG. 8A is a sectional view of a lamp unit including a reflecting mirror with a mirror diameter of 50 mm, and FIG. 8B is a sectional view of a lamp unit including a reflecting mirror with a diameter of 35 mm. Here, a reflecting mirror with a mirror diameter of 50 mm is a mirror being a same size as a maximum mirror that can be housed in a 50-mm cube.

As shown in FIG. 8A, in a reflecting mirror with a mirror diameter of 50 mm as an example of a conventional reflecting mirror, for example, a first focal distance f1 is 6.5 [mm], a second focal distance f2 is 150 [mm], and ellipticity (A−B)/A is 0.59. An effective reflective region to light radiated from the arc tube is in a range that is measured by rotating a vertical line passing through the center O 48.31[°] to a neck part-side and a range that is measured by rotating the vertical line 39.59[°] to an opening-side.

When a reflecting mirror with a mirror diameter of 50 mm is used, in any cases where $C_M/C_O$ in the high pressure discharge lamp is 0.73, 0.80, or 0.85, major problems do not occur to collect light because the light passing through the sealing part-side portion on the opening-side falls within the effective reflective region of the reflecting mirror. Furthermore, on the neck part-side, problems are less likely to occur because the effective reflective region has a room of about 8° to light intensity distribution.

On the other hand, as shown in FIG. 8B, a reflecting mirror with a mirror diameter of 35 mm, as an example of a small-sized reflecting mirror recently having become popular in the market, has an opening size and the first focal distance f1 that are approximately 20 to 30 percent less than those of a reflecting mirror with a mirror diameter of 50 mm. For example, the first focal distance f1 is 4.8 [mm], the second focal distance f2 is 60 [mm], and ellipticity (A−B)/A is 0.48. The effective reflective region to light radiated from the arc tube 110 is in a range that is measured by rotating a vertical line passing through the center O 30.43[°] to a neck part-side and a range that is measured by rotating the vertical line 39.46[°] to an opening-side. The effective reflective region on the neck part-side is 17.88[°] smaller than that of a reflecting mirror with a mirror diameter of 50 mm.

As described above, in a reflecting mirror with a diameter of 35 mm in which the effective reflective region is small, light focused on the second focal point F2 tends to be reduced. When the reflecting mirror is combined with the high pressure discharge lamp in which $C_M/C_O$ is 0.73 c, light in the sealing part-side portions included in an angle of about 10[°] is not used, and the light focused on the second focal point F2 is reduced accordingly. When the reflecting mirror is combined with the high pressure discharge lamp in which $C_M/C_O$ is 0.80 or 0.85, the high pressure discharge lamp exhibits light intensity distribution properties indicating that the level of light in the central portion is equal to or higher than the level of light in the sealing part-side portions. Therefore, a ratio of unused light to entire light is low. Since only part of light in the sealing part-side portions are not used, light to a screen is not reduced significantly.

Note that, since the high pressure discharge lamp in which $C_M/C_O$ is 0.85 c exhibits favorable light intensity distribution properties indicating that the level of light is the highest in the central portion, the light can be used sufficiently even when the high pressure discharge lamp is combined with the small-sized reflecting mirror in which the effective reflective region is small.

Precision of a spheroidal surface tends to decrease in the vicinity of the neck part, and the thickness tends to be reduced in the vicinity of the opening compared with the other parts. In the central part, however, there is not such a tendency. Moreover, the central part weighs heavily in reflection efficiency, and has a strong effect on the luminous flux to a screen. For these reasons, the high pressure discharge lamp in which $C_M/C_O$ is 0.85 c is suitable to be combined with the reflecting mirror.

When $C_M/C_O$ is higher than 0.9 (for example, when $C_M/C_O$ is 0.93), however, regarding light focused on an irradiated surface corresponding to the second focal point $F_2$, a great difference in luminance is created between a center of the irradiated surface and peripheries of the irradiated surface. Even when the light is projected on a screen through a lens array that provides uniform distribution of light by using a number of small-sized lenses, a significant difference in luminance is created between a center of the screen and peripheries of the screen. Therefore, in order to decrease the difference in luminance between the center of the screen and the peripheries of the screen, it is preferable that $C_M/C_O$ be 0.9 or lower.

<Distance $C_O$ and Distance W>

As shown in FIG. 3, when the distance CO is in a range of 1.5 to 3.0 [mm] inclusive and the distance W is in a range of 3.0 to 5.0 [mm] inclusive, an inner surface of the light-emitting part 111 has a circular arc shape. Therefore, an angle made by light incident on a glass in the light-emitting part 111 from the discharge space 113 and the vertical axis $Y_O$ is reduced. With this structure, light intensity distribution properties in which the intensity peaks are in the central portion are exhibited. Therefore, when the high pressure discharge lamp having this structure is combined with a small-sized reflecting mirror in which the effective reflective region is small, an absolute quantity of light is less likely to be reduced. Therefore, the combination is useful for a small-sized thin-type image display apparatus.

When the distance $C_O$ is less than 1.5 [mm], however, a luminescence center is positioned too close to the inner surface of the light-emitting part 111, and problems such as devitrification and blackening are likely to occur. When the distance $C_O$ is more than 3.0 [mm], the thickness of the light-emitting part 111 is excessively reduced, and resistance against pressure is reduced. This may result in breakage of the arc tube 110.

When the distance W is less than 3.0 [mm], the luminescence center is positioned too close to the light-emitting part-side portions 116 of the sealing part 112, and thus, the temperature of the light-emitting part-side portions 116 of the sealing part 112 becomes too high. This may result in breakage of the arc tube 110. In addition, problems such as adhesion of tungsten, which constitutes an electrode and is sputtered during startup, to an inner surface are likely to occur. When the distance W is more than 5.0 [mm], since the sealing part-side portions 114 of the light-emitting part 111 are too distant from the luminescence center, the temperature of the sealing part-side portions 114 becomes low. Thus, mercury does not completely vaporize, and therefore an amount of luminous flux is reduced.

<Molding Method of Light-Emitting Part>

The following describes a manufacturing method of an arc tube including a light-emitting part of a desired shape. For example, a silica tube with an outer diameter of 6 [mm], an inner diameter of 2 [mm], and a length of 1200 [mm] is divided into quarters to obtain four cut tubes each having a length of 300 [mm]. Both ends of one of the cut tubes are held by a rotary chuck, and a central portion of the cut tube is heated by a gas burner to be softened while the cut tube is rotated. At this time, an inert gas such as argon and nitrogen is blown into the cut tube through the both ends of the cut tube to form an inner shape of the light-emitting part. At the same time, an inflated portion of the cut tube is molded by a molding jig provided so as to surround the central portion of the cut tube to form an outer shape of the light-emitting part. The light-emitting part of the arc tube is processed by adjusting conditions such as thermal power of a burner, pressure of an inert gas, and force and speed of pushing the cut tube from the both ends toward the central portion.

[Details of Shape of Reflecting Mirror]

<Angle $OF_2R$ and Angle $OF_2Q$>

As shown in FIG. 2, the high pressure discharge lamp 101 and the reflecting mirror 102 are positioned such that the center O coincides with the first focal point $F_1$ of the spheroidal surface 163. Light radiated from the arc tube 110 is reflected by the spheroidal surface 163 in a region ranging from G to H. All of the light reflected in the region ranging from G to H is ideally focused on the second focal point $F_2$ of the spheroidal surface 163.

When a point where a line passing through the second focal point $F_2$ and the contact point Q intersects with the spheroidal surface 163 is represented by N, however, light reflected in a region ranging from G to N is lost because the light-emitting part 111 obstructs the light. Furthermore, when a point where a line passing through the second focal point $F_2$ and the periphery R intersects with the spheroidal surface 163 is represented by N', light reflected in a region ranging from N to N' is lost because the sealing part 112 obstructs the light in a case where the angle $OF_2R$ is more than the angle $OF_2Q$.

Therefore, in order not to lose the light reflected in the region ranging from N to N', it is preferable that the angle $OF_2R$ be equal to or less than the angle $OF_2Q$. With this structure, vignetting caused by the sealing part 112 is prevented, and thus light is focused on the second focal point $F_2$ efficiently. Therefore, it becomes possible to provide improved light to a screen in a lamp unit 100.

Specifically, by reducing a diameter of an end of the sealing part 112, the angle $OF_2R$ can be equal to or less than the angle $OF_2Q$. That is to say, when the diameter of the sealing part 112 is constant as shown by an imaginary line in FIG. 2, and thus the angle $OF_2R'$ is more than the angle $OF_2Q$, the angle $OF_2R$ can be equal to or less than the angle $OF_2Q$ by reducing the diameter of the end of the sealing part 112.

Note that the angle $OF_2R$ can be equal to or less than the angle $OF_2Q$ by reducing the length of the sealing part 112. When the rated power P is high, however, the sealing part 112 is required to be lengthened to lower the temperature of the arc tube 110. In this case, an effective way is to reduce the diameter of the end of the sealing part 112. Note that the end of the sealing part 112 can be tapered by being heated using a burner, laser, or the like.

<Ellipticity (A−B)/A>

As shown in FIG. 2, it is preferable that, the major radius A and the minor radius B of the spheroidal surface 163 satisfy a relation 0.4.ltoreq.(A−B)/A.ltoreq.0.5. For example, in a case of a reflecting mirror with a mirror diameter of 35 mm, by setting the major radius A to be 32.4 [mm], the minor radius B to be 16.971 [mm], the first focal distance f1 to be 4.8 [mm], and the second focal distance f2 to be 60 [mm], a small-sized reflecting mirror that provides improved luminous flux to a screen is obtained. In this case, (A−B)/A is about 0.48, and an incident angle on the collimating lens 172 is about 19 [.degree.].

When (A−B)/A is more than 0.5, the first focal distance f1 is equal to or less than 4.5 [mm] in the above-mentioned reflecting mirror with a mirror diameter of 35 mm. Therefore, the light-emitting part 111 of the arc tube 110 is positioned too close to the spheroidal surface 163 of the reflecting mirror 102. This is not preferred because the temperature of the light-emitting part 111 and the sealing parts 112 increases easily, and breakage of the arc tube 110 is likely to occur.

By contrast, when (A−B)/A is less than 0.4, an incident angle on the collimating lens 172 (see FIGS. 1A and 1B) positioned on the second focal point $F_2$ of the spheroidal surface 163 increases. Therefore, part of light is reflected on a surface of the collimating lens 172 and lost. For example, when a biconcave lens with the first focal distance of about 1 [mm] is used as the collimating lens 172, the incident angle is required to be equal to or less than 26.6[°] to reduce a loss of light.

For the above-mentioned reasons, in a case of a small-sized reflecting mirror such as a reflecting mirror with a mirror diameter of 35 mm, it is preferable that the relation 0.4<(A−B)/A.ltoreq.0.5 be satisfied. Note that, in a case of a reflecting mirror with a mirror diameter of 50 mm, since the major radius A and the minor radius B are more than those in the small-sized reflecting mirror, it is preferable that the relation 0.4.ltoreq.(A−B)/A.ltoreq.0.6 be satisfied.

[High Efficiency Confirmation Experiment]

In order to confirm the effects of the present invention on efficiency, the following experiment was conducted.

Experiment 1

A lamp unit was produced by building a high pressure discharge lamp including the arc tube of the present invention (the maximum outer diameter D is 9.0 [mm], the radius of curvature of the outer surface of the arc tube is 5.45 [mm], the distance $C_O$ is 2.0 [mm], $C_M/C_O$ is 0.8, the distance W is 4.0 [mm], and the density of mercury is 0.3 [mg/mm.sup.3]) into a .quadrature.35 mm reflecting mirror (the first focal distance f1 is 4.8 [mm] and the second focal distance f2 is 60 [mm]). The produced lamp unit was then lit at 200 [W] power. Light passing through a 5 φ aperture was collected on an integrating sphere, and illuminance [1×] thereof was measured. For comparison, another lamp unit was produced by building a high pressure discharge lamp including a conventional arc tube (the maximum outer diameter D is 10.2 [mm], the radius of curvature of the outer surface of the arc tube is 5.1 [mm], the distance $C_O$ is 2.2 [mm], $C_M/C_O$ is 0.72, the distance W is 4.0 [mm], and the density of mercury is 0.3 [mg/mm$^3$]) into a reflecting mirror with a mirror diameter of 50 mm (the first focal distance f1 is 6.5 [mm] and the second focal distance f2 is 150 [mm]). Then, the illuminance of the other lamp unit was measured under the same conditions as those used for the high pressure discharge lamp of the present invention. Note that the 5 φ aperture is positioned on the second focal point of each of the reflecting mirrors, and light is allowed to pass through the aperture.

As a result of evaluation, it was found that illuminance of the lamp unit of the present invention was improved by about 8[%] compared with that of the conventional lamp unit. Accordingly, it was found that the lamp unit of the present invention was highly efficient while it was smaller in size compared with a conventional lamp.

Experiment 2

Next, a lamp unit was produced by building a high pressure discharge lamp including the conventional arc tube used in Experiment 1 into a reflecting mirror with a mirror diameter of 35 mm. Then, the illuminance of the lamp unit was measured under the same conditions as those used in Experiment 1 by collecting light passing through the φ 5 aperture.

As a result, it was found that the illuminance of the lamp unit that was produced by building the high pressure discharge lamp including the conventional arc tube into a reflecting mirror with a mirror diameter of 35 mm was reduced by about 3[%] compared with the illuminance of the conventional lamp unit that was produced by building the high pressure discharge lamp including the conventional arc tube into a reflecting mirror with a mirror diameter of 50 mm used in Experiment 1.

Based on the results of Experiment 2, it was assumed that the illuminance was reduced because the effective reflective region of the reflecting mirror was reduced due to a simple reduction of a size of the reflecting mirror and because light in the sealing part-side portions was not used to increase the illuminance when $C_M/C_O$, which contributes to light intensity distribution properties of the arc tube, was lower than 0.8 as described with reference to FIGS. 8A and 8B.

The reason why the illuminance of the lamp unit that was produced by building the high pressure discharge lamp including the arc tube of the present invention into a reflecting mirror with a mirror diameter of 35 mm could be improved in Experiment 1 is that a loss of luminous flux in the sealing part-side portions was suppressed by setting $C_M/C_O$ to 0.8 to improve light intensity distribution properties. In addition, vignetting could be prevented due to a reduction of a size of the light-emitting part of the arc tube.

[Image Display Apparatus]

Figure 9:
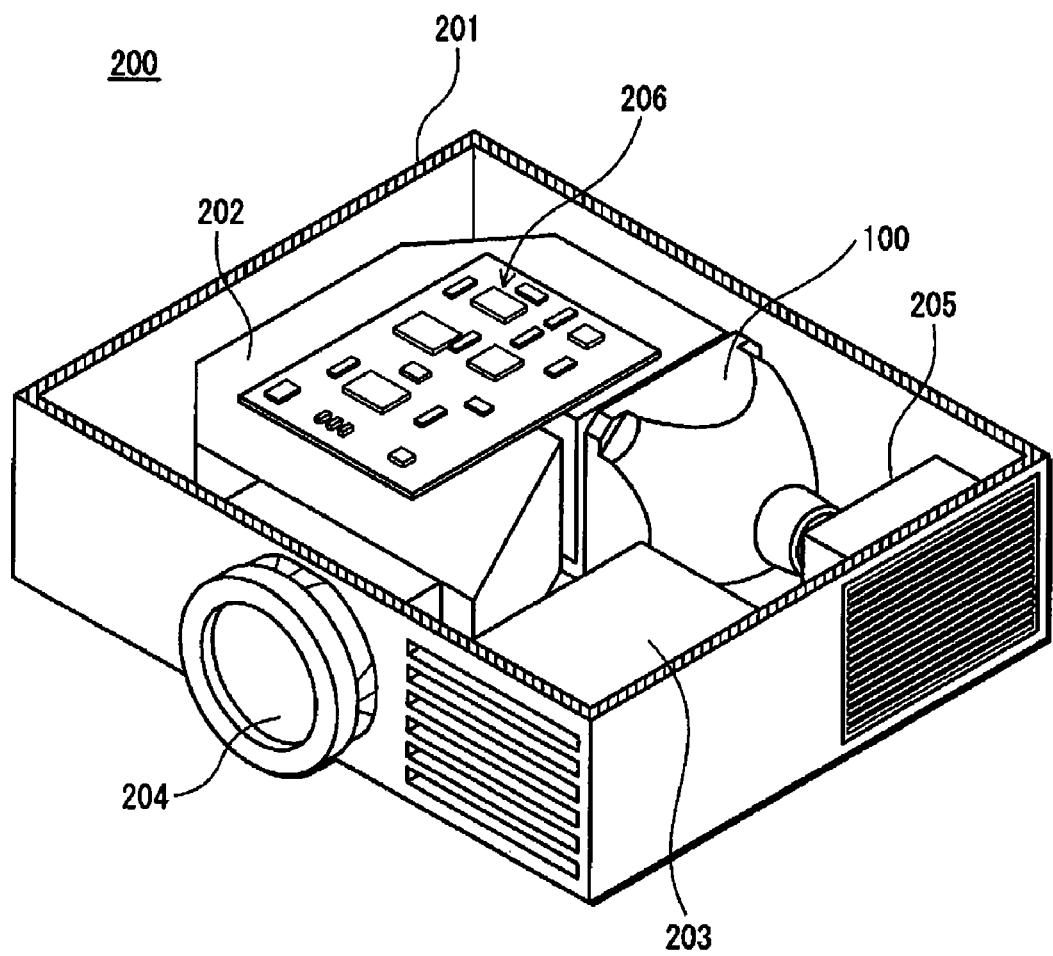
FIG. 9 is a partially cutout perspective view showing an example of an image display apparatus in Embodiment 2.

FIG. 9 is a partially cutout perspective view showing an example of an image display apparatus in Embodiment 2. A top board of a case of the image display apparatus is omitted from FIG. 9 so that internal components can be seen. As shown in FIG. 9, a first image display apparatus 200 in Embodiment 2 is a front projector that projects images on a screen (not illustrated) placed in front thereof, and uses DLP™ technology. The image display apparatus 200 has a structure in which an optical unit 202, a control unit 203, a projection lens 204, a cooling fan unit 205, and a power supply unit 206 are housed in a case 201. The optical unit 202 includes the lamp unit 100 as a light source, a DMD™ (not illustrated), and a color wheel composed of three different colored color filters (not illustrated). The control unit 203 controls and drives the DMD and the like. The power supply unit 206 converts electric power supplied from a commercial power source into electric power suitable for the control unit 203 and the lamp unit 100, and supplies the converted electric power.

Figure 10:
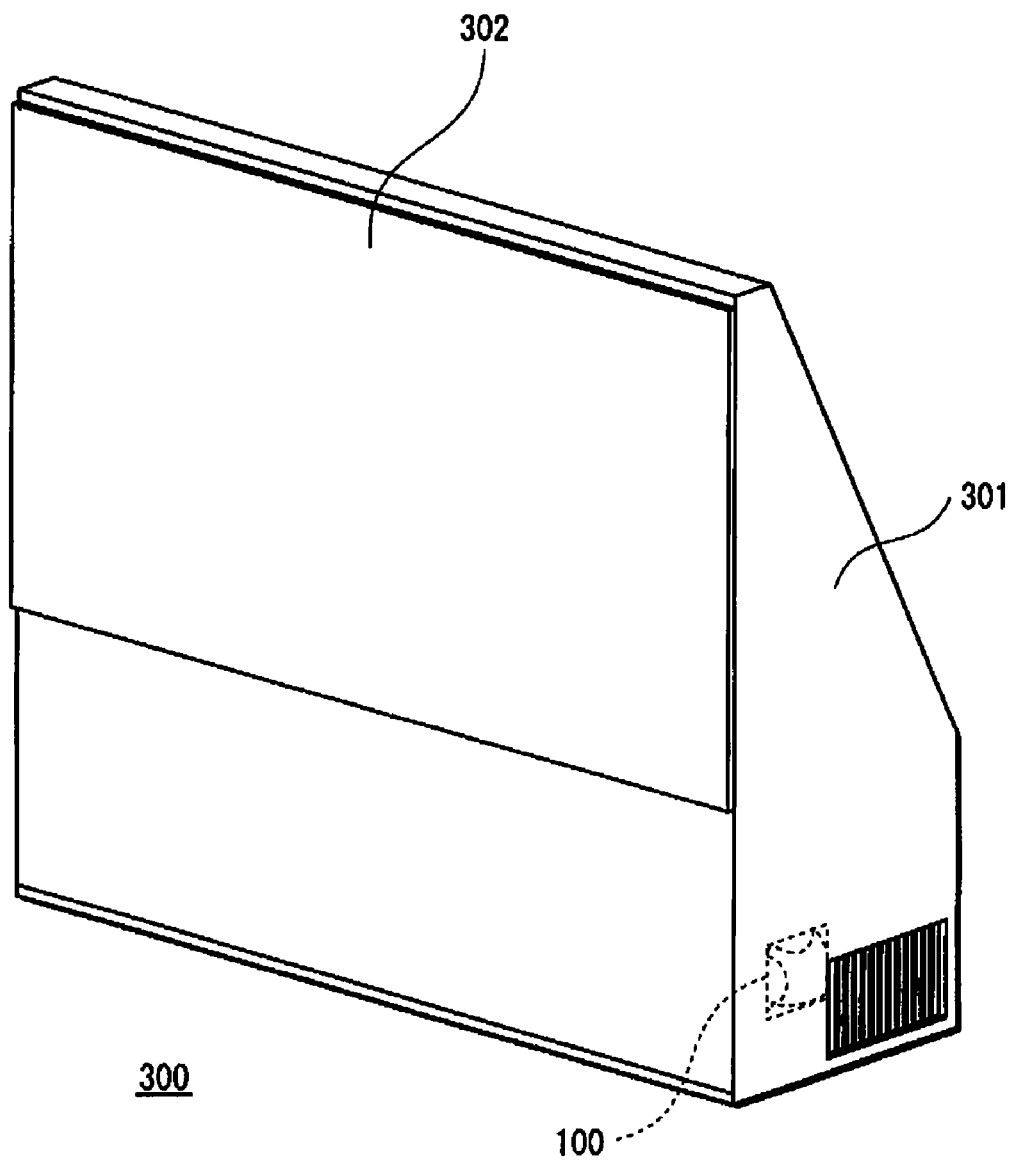
FIG. 10 is a perspective view showing an example of an image display apparatus in Embodiment 3.

FIG. 10 is a perspective view showing an example of an image display apparatus in Embodiment 3. As shown in FIG. 10, a second image display apparatus 300 in Embodiment 3 is a rear projector and has a structure in which the lamp unit 100 as a light source, an optical unit (not illustrated), a projection lens (not illustrated), and a mirror (not illustrated) are housed in a case 301. Images projected from the projection lens and then reflected by the mirror are projected from behind a translucent screen 302 and displayed.

In the image display apparatus 200 in Embodiment 2 and the image display apparatus 300 in Embodiment 3, the high pressure discharge lamp 101 that is small in size and highly efficient, exhibits favorable light intensity distribution properties, and includes the arc tube 110 being rarely damaged is used. Therefore, the image display apparatuses 200 and 300 are smaller in size, provide improved luminous flux to a screen, and are less likely to malfunction compared with a conventional image display apparatus.

[Modifications]

Although details of the high pressure discharge lamp, lamp unit, and image display apparatus of the present invention are described above based on embodiments, the present invention is not limited to those described in the above embodiments. The following describes modifications thereof.

<Modification 1>

Figure 11:
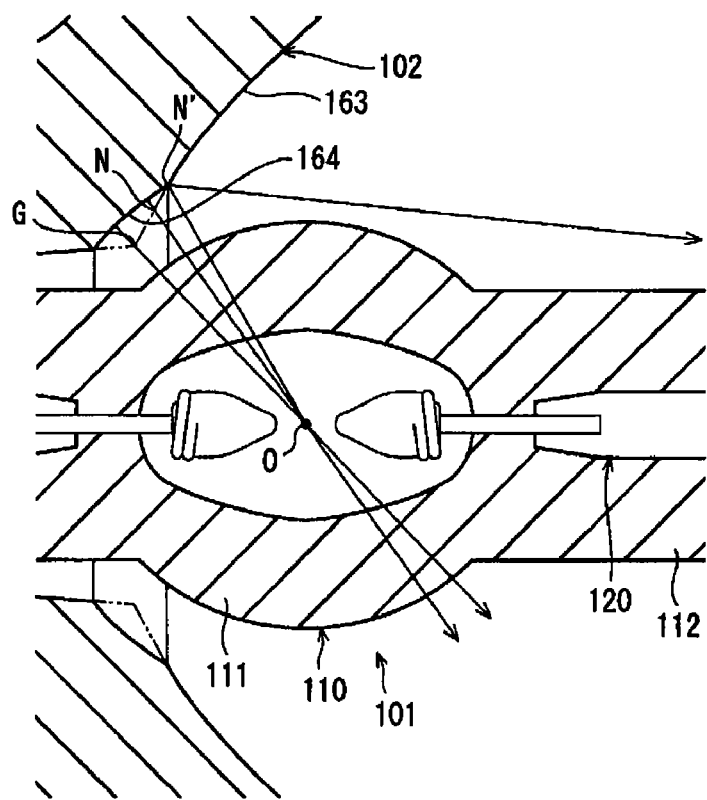
FIG. 11 is a sectional view of a lamp unit in Modification 1 in the vicinity of a light-emitting part thereof.
Figure 12:
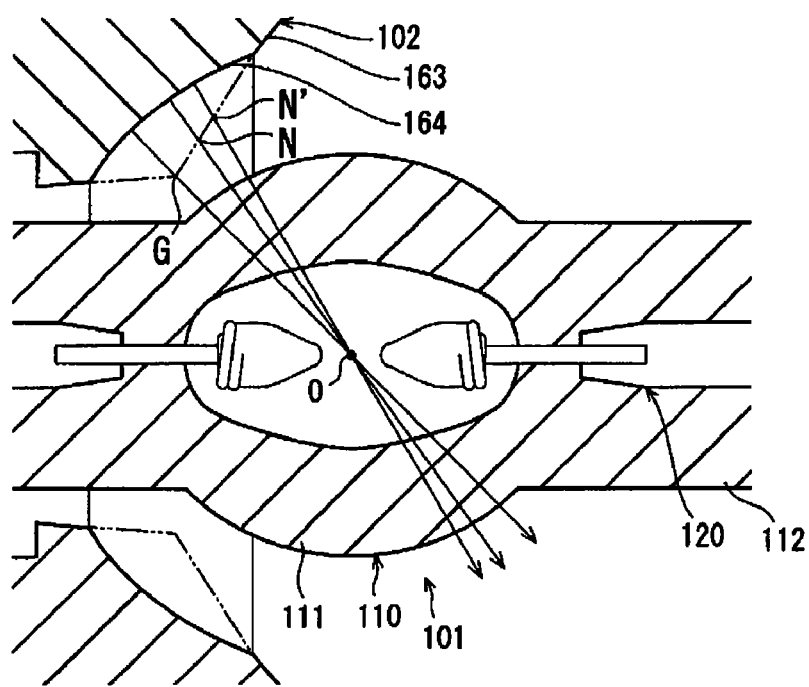
FIG. 12 is a sectional view of the lamp unit in Modification 1 in the vicinity of the light-emitting part thereof.

FIGS. 11 and 12 are sectional views of a lamp unit in Modification 1 in the vicinity of the light-emitting part thereof. Note that symbols "G", "N", and "N'" in FIGS. 11 and 12 correspond to symbols "G", "N", and "N'" in FIG. 2, respectively.

As shown in FIG. 11, the reflecting mirror 102 of the lamp unit in Modification 1 further includes a spherical reflecting surface 164 on the spheroidal surface 163 on a side of the neck part (in the left side in FIG. 11).

When the reflecting mirror 102 does not include the spherical reflecting surface 164, the spheroidal surface 163 is formed in a region ranging from G to N shown by an imaginary line in FIG. 11. Light reflected in the region ranging from G to N is not focused on the second focal point $F_2$ by being obstructed by the light-emitting part 111 of the arc tube 110.

When the spherical reflecting surface 164 whose center of curvature coincides with the first focal point $F_1$ of the spheroidal surface 163 is formed at least in a region ranging from G to N, however, the light to be reflected in the region ranging from G to N on the spheroidal surface 163 and obstructed by the light-emitting part 111 can be reflected by the spherical reflecting surface 164 and focused on the center O. The light focused on the center O then passes through the center O and the light-emitting part 111, reflected by the spheroidal surface 163, and focused on the second focal point $F_2$. As described above, light to be lost due to vignetting caused by the light-emitting part 111 can be used effectively. Therefore, efficiency of collecting light is improved in the lamp unit, and thus light projected on a screen is increased.

Another effect obtained by forming the spherical reflecting surface 164 is that life of the high pressure discharge lamp is increased. This is because, by increasing a distance between the arc tube 110 and the reflecting mirror 102, a localized increase in temperature of the arc tube 110 is prevented.

When the angle $OF_2R$ is more than the angle OFQ as shown in FIG. 12, it is necessary to form the spherical reflecting surface 164 so as to cover at least a region ranging from G to N'. With this structure, light to be lost due to vignetting caused by the sealing part 112 can also be used efficiently.

Note that, when the spherical reflecting surface 164 is formed, temperature of the electrode 130 that is on a side of the neck part 161 might be increased by light reflected by the spherical reflecting surface 164 and focused on the center O, and might lead to degradation of the electrode 130. As a method for lessening degradation of the electrode 130 on the side of the neck part 161, a method of increasing heat capacity of the electrode 130 on the side of the neck part 161 compared with that of the electrode 130 on the other side is considered. The heat capacity of the electrode 130 is increased by adjusting a diameter of the electrode pin 131, and a diameter or the number of turns of the coil 132. When the heat capacity of the electrode 130 is increased by these methods, it is preferable to prevent the light from being obstructed by the electrode 130.

<Modification 2>

Figure 13:
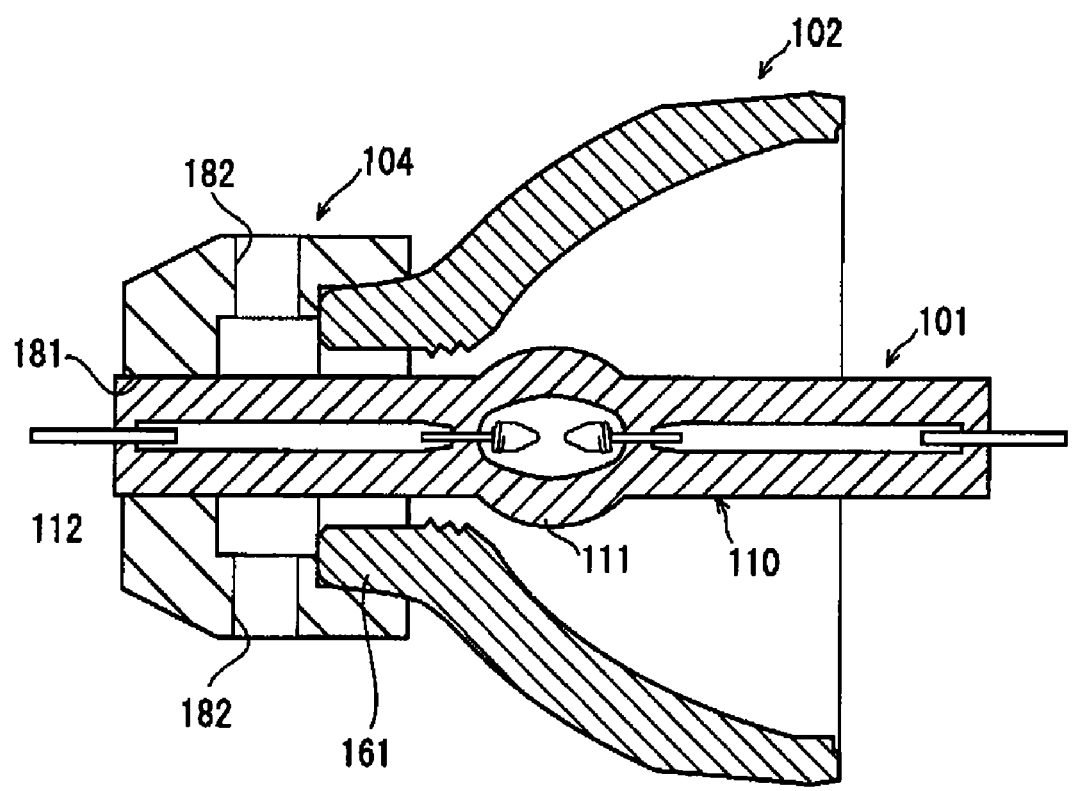
FIG. 13 is a sectional view of a lamp unit in Modification 2.

FIG. 13 is a sectional view of a lamp unit in Modification 2. As shown in FIG. 13, the lamp unit in Modification 2 is obtained by joining the high pressure discharge lamp 101 and the reflecting mirror 102 together by a base 104.

The base 104 has a shape like a cap, and has a though hole 181 at a top thereof and a pair of air vents 182 at both sides thereof. The sealing part 112 passes through the through hole 181. An outdoor air is taken in the base 104 through the pair of air vents 182. The base 104 is fixed to the reflecting mirror 102 by using an adhesive agent or the like in a state where the base 104 is fit onto the neck part 161 of the reflecting mirror 102. The base 104 is also fixed to the high pressure discharge lamp 101 by using an adhesive agent or the like in a state where the high pressure discharge lamp 101 passes through the though hole 181 in the sealing part 112 thereof. Air passes through a space between the neck part 161 and the sealing part 112, because the high pressure discharge lamp 101 and the reflecting mirror 102 are joined together by the base 104 and thus the space is not filled with cement.

With the above-mentioned structure, it becomes possible to allow an outdoor air, which flows in the reflecting mirror 102 through the cooling window of the housing (see FIGS. 1A and 1B), to pass through the space between the neck part 161 and the sealing part 112 and to escape to the outside of the base 104 through the air vent 182. The light-emitting part 111 of the high pressure discharge lamp 101 is cooled efficiently with this structure. In addition, by cooling the light-emitting part 111 efficiently, a flow rate of a cooling fan (not illustrated) is decreased, and thus noises in the image display apparatus are suppressed.

INDUSTRIAL APPLICABILITY

The high pressure discharge lamp, the lamp unit, and the image display apparatus of the present invention are broadly applicable to a projector such as a liquid crystal projector and a DMD projector.

REFERENCE SIGNS LIST 100 lamp unit
101 high pressure discharge lamp
102 reflecting mirror
103 housing
110 arc tube
111 light-emitting part
112 sealing part
161 neck part
163 spheroidal surface
164 spherical reflecting surface
130 electrode
174 cooling window
200 and 300 image display apparatus

The invention claimed is:

1. A high pressure discharge lamp comprising:
an arc tube that includes:
  a light-emitting part having a substantially spherical shape and having mercury enclosed therein; and
  a pair of sealing parts extending from opposite sides of the light-emitting part; and
  a pair of electrodes that are arranged in the arc tube such that an end of each electrode is sealed by a respective sealing part and the other ends of the electrodes oppose each other in the light-emitting part, wherein
the enclosed mercury has a density of 0.2 to 0.4 [mg/mm3] inclusive,
a distance W from a contact point S to a center O of the light-emitting part is 3.0 to 5.0 [mm] inclusive, where the contact point S represents a point where a tube axis Z of the arc tube intersects with an inner surface of the arc tube,
a distance $C_O$ from a contact point $T_O$ to the center O is 1.5 to 3.0 [mm] inclusive, where the contact point $T_O$ represents a point where a vertical axis $Y_O$, which passes through the center O and is perpendicular to the tube axis Z, intersects with the inner surface of the arc tube,
the distance $C_O$ and a distance $C_M$ from a contact point $T_M$ to a midpoint M satisfy a relation $C_M/C_O \geqq 0.8$, where the midpoint M represents a midpoint between the center O and the contact point S, and the contact point $T_M$ represents a point where a vertical axis $Y_M$, which passes through the midpoint M and is perpendicular to the tube axis Z, intersects with the inner surface of the arc tube, and
a minimum thickness X [mm] of the arc tube in sealing part-side portions and a maximum outer diameter D [mm] of the light-emitting part satisfy a relation $X/D \geqq 0.2$, the sealing part-side portions being portions of the light-emitting part that are close to the sealing parts.

2. The high pressure discharge lamp of claim 1, wherein
a rated power P is 100 to 300 [W] inclusive, and
the maximum outer diameter D [mm] and the rated power P satisfy a relation $D \leqq 0.02 \times P + 6$.

3. A lamp unit comprising:
the high pressure discharge lamp of claim 1; and
a reflecting mirror that includes:
  a neck part to which one of the sealing parts of the high pressure discharge lamp is fixed; and
  a spheroidal surface that reflects light radiated from the high pressure discharge lamp.

4. The lamp unit of claim 3 further comprising:
a housing attached to a part of the reflecting mirror on a side opposite to the neck part, and having a cooling window.

5. The lamp unit of claim 3, wherein
when the center O coincides with a first focal point $F_1$ of the spheroidal surface, an angle $OF_2R$ is equal to or less than an angle $OF_2Q$, where the angle $OF_2R$ represents an angle made by the center O, a second focal point $F_2$ of the spheroidal surface, and a periphery R of an end of one of the sealing parts that is not fixed to the neck part, and the angle $OF_2Q$ represents an angle made by the center O, the second focal point $F_2$, and a contact point Q where an outer surface of the light-emitting part intersects with the vertical axis $Y_O$.

6. The lamp unit of claim 3, wherein
a major radius A and a minor radius B of the spheroidal surface satisfy a relation $0.4 \leqq (A-B)/A \leqq 0.6$.

7. The lamp unit of claim 3, wherein
the reflecting mirror further includes a spherical reflecting surface that is on the spheroidal surface on a side of the neck part and has a center of curvature coinciding with a first focal point F1 of the spheroidal surface.

8. An image display apparatus comprising the lamp unit of claim 3.

* * * * *